United States Patent
Kusiak et al.

(10) Patent No.: US 8,577,822 B2
(45) Date of Patent: Nov. 5, 2013

(54) DATA-DRIVEN APPROACH TO MODELING SENSORS WHEREIN OPTIMAL TIME DELAYS ARE DETERMINED FOR A FIRST SET OF PREDICTORS AND STORED AS A SECOND SET OF PREDICTORS

(75) Inventors: Andrew Kusiak, Iowa City, IA (US); Zhe Song, Nanjing (CN)

(73) Assignee: University of Iowa Research Foundation, Iowa City, IA (US)

( * ) Notice: Subject to any disclaimer, the term of this patent is extended or adjusted under 35 U.S.C. 154(b) by 864 days.

(21) Appl. No.: 12/567,380

(22) Filed: Sep. 25, 2009

(65) Prior Publication Data
US 2010/0152905 A1    Jun. 17, 2010

Related U.S. Application Data

(60) Provisional application No. 61/100,164, filed on Sep. 25, 2008.

(51) Int. Cl.
*G06F 17/00* (2006.01)

(52) U.S. Cl.
USPC .......................................................... 706/45

(58) Field of Classification Search
USPC ............................................... 706/12, 45, 62
See application file for complete search history.

(56) References Cited

U.S. PATENT DOCUMENTS

| | | | |
|---|---|---|---|
| 5,386,373 | A | 1/1995 | Keeler et al. |
| 5,781,432 | A | 7/1998 | Keeler et al. |
| 6,278,899 | B1 | 8/2001 | Piche et al. |
| 2007/0142975 | A1* | 6/2007 | Piche .............................. 700/286 |
| 2007/0203860 | A1* | 8/2007 | Golden et al. ................. 705/412 |
| 2007/0203862 | A1* | 8/2007 | Sekiai et al. ..................... 706/16 |
| 2008/0195255 | A1* | 8/2008 | Lutze et al. .................... 700/291 |
| 2009/0125155 | A1 | 5/2009 | Hill et al. |

FOREIGN PATENT DOCUMENTS

WO    WO 2008/019037    2/2008

OTHER PUBLICATIONS

Song et al., Constraint Based Control of Boiler Efficiency: A Data Mining Approach, Feb. 2007, IEEE, pp. 73-82.*
Kusiak et al., Clustering-Based Performance Optimization of the Boiler-Turbine System, Jun. 2008, IEEE, pp. 651-658.*
Abido, Multiobjective Evolutionary Algorithms for Electric Power Dispatch Problem, Jun. 2006, IEEE, pp. 315-329.*
Abido, M. A. "Multiobjective evolutionary algorithms for electric power dispatch," *IEEE Trans. Evol. Comput.*, vol. 10, No. 3, pp. 315-329, Jun. 2006.

(Continued)

*Primary Examiner* — David Vincent
(74) *Attorney, Agent, or Firm* — Smith, Gambrell & Russell, LLP

(57) ABSTRACT

A method, computer program product and system are provided for modeling non-controllable parameters affecting system performance. The method may include receiving historical values for each of a plurality of system parameters and grouping the system parameters into controllable, non-controllable, and performance parameters. The method may further include determining a first set of predictors from the non-controllable parameters using the historical values of these non-controllable parameters and, for each predictor in the first set, determining optimal time instances at which a value of each predictor is measured using non-uniform time scales. These optimal time instances may then be saved as a second set of predictors. One or more constraints may then be established for each of the controllable parameters. Finally, a dynamic model based on the second set of predictors, the controllable parameters, and the performance parameters may be constructed and optimized.

20 Claims, 12 Drawing Sheets

(56) References Cited

OTHER PUBLICATIONS

Astrom, K.J. and Bell, R. D. "Drum-boiler Dynamics," *Automatica*, vol. 36, No. 3, pp. 363-378, 2000.
Bell, R. D. and Astrom, K. J. "Dynamic models for boiler—turbine—alternator units: Data logs and parameter estimation for a 160.MW unit," Lund Inst. Technol., Lund, Sweden, Tech. Rep. TFRT-3192, 1987.
Brogan, W. L. *Modern Control Theory*, 3rd ed. Englewood Cliffs, NJ: Prentice-Hall, 1991.
Ben-Abdermour, A. and Lee, K. Y. "An autonomous control system for boiler—turbine units," *IEEE Trans. Energy Convers.*, vol. 11, No. 2, pp. 401-406, Jun. 1996.
Bequette, B. W. *Process Control: Modeling Design and Simulation*. Upper Saddle River, NJ: Pearson, 2003.
Burns, A. Kusiak, A. and T. Letsche, "Mining transformed data sets," in *Knowledge-Based Intelligent Information and Engineering Systems*, vol. I, R. Khosla, R. J. Howlett, and L. C. Jain, Eds. Heidelberg, Germany: Springer, 2004, pp. 148-154.
Casella, G. and Berger, R. *Statistical Inference*, 2nd ed., Pacific Grove, CA: Brooks/Cole, 1990.
de Mello, F. P. "Boiler models for sytem dynamic performance studies," *IEEE Trans. Power Syst.*, vol. 6, No. 1, pp. 66-74, Feb. 1991.
Espinosa, J. et al. *Fuzzy Logic, Identification and Predictive Control*. London, U.K.: Springer-Verlag, 2005.
Farhad, S. et al. "Energy saving in operating steam power plants based on ASME performance test code," in *Proc. 2005 ASME Power Conf.*, Chicago, IL, pp. 1381-1385.
Friedman, J. H. "Stochastic Gradient Boosting," *Computational Statistics & Data Analysis*, vol. 38, No. 4, pp. 367-378, 2002.
Friedman, J. H. "Greedy Function Approximation: A Gradient Boosting Machine," *Annals of Statistics*, vol. 29, No. 5, pp. 1189-1232, 2001.
Hangos, K. M. et al. *ntelligent Control Systems: An Introduction with Examples*. Amsterdam, The Netherlands: Kluwer, 2001.
Kang, L. and Albin, S. "On-line monitoring when the process yields a linear profile," *Journal of Quality Technology*, vol. 32, No. 4, pp. 418-426, 2000.
Khalil, H. K. *Nonlinear Systems*, 2nd ed. Englewood Cliffs, NJ: Prentice-Hall, 1996.
Kohavi, R. and John, G. "Wrappers for Feature Subset Selection," *Artificial Intelligence*, vol. 97, No. 1-2, pp. 273-324, 1997.
Kuprianov, V. I. "Applications of a cost-based method of excess air optimization for the improvement of thermal efficiency and environmental performance of steam boilers," *Renew. Sustainable Energy Rev.*, vol. 9, No. 5, pp. 474-498, 2005.
Kusiak, A. and Zheng, H. "Virtual Sensors for HVAC and Wind Turbine Systems." Paper submitted to Department of Mechanical and Industrial Engineering, The University of Iow, Iowa City, IA, Dec. 22, 2009.
Kusiak, A. "Clustering-Based Performance Optimization of the Boiler-Turbine System." *IEEE Transactions on Energy Conversion* 23(2):651-658, 2008.
Kusiak, A. and Song, Z. "Combustion efficiency optimization and virtual testing: A data-mining approach," *IEEE Trans. Ind. Inf.*, vol. 2, No. 3, pp. 176-184, Aug. 2006.
Kusiak, A. and Shah, S. "A data-mining-based system for prediction of water chemistry faults," *IEEE Trans. Ind. Electron.*, vol. 53, No. 2, pp. 593-603, Apr. 2006.
Kusiak, A., Burns, A.and Milster,F. "Optimizing combustion efficiency of a circulating fluidized boiler: A data mining approach," *Int. J. Knowl.-Based Intell. Eng. Syst.*, vol. 9, No. 4, pp. 263-274, 2005.

Kusiak, A. et al. "Modeling Indoor-Air-Quality Sensors in HVAC Systems." Paper submitted to Department of Mechanical and Industrial Engineering, The University of Iow, Iowa City, IA (no date).
Kusiak, A. and Zhentg, H. "A Wind Speed Virgnal Sensor for Wind Turbines." Paper submitted to Department of Mechanical and Industrial Engineering, The University of Iow, Iowa City, IA (no. date).
Li, M. and Zheng, H. "Virtual Sensor for Wind Speed of a Utility-scale wind turbine: Dynamic Control of Wind Turbines." Power Point Presentation, Intelligent Systems Laboratory, The University o Iowa, Jan. 20, 2009.
Li, S. et al. "A new coordinated control strategy for boiler—turbine system of coal-fired power plant," *IEEE Trans. Control Syst. Technol.*, vol. 13, No. 6, pp. 943-954, Nov. 2005.
Li, D. et al. "Life extending control of boiler—turbine systems via model predictive methods," *Control Eng. Pract.*, vol. 14, No. 4, pp. 319-326, 2006.
MacQueen, J. B. "Some methods for classification and analysis of multivariate observations," in *Proc. 5th Berkeley Symp. Math. Stat. Probab.*, Berkeley, CA: Univ. of California Press, vol. 1, 1967, pp. 281-297.
Mitra, A. *Fundamentals of Quality Control and Improvement*, 2nd ed., New Jersey: Prentice Hall, Upper Saddle River, 1998.
Montgomery, D.C., *Introduction to Statistical Quality Control*, 5th ed., New York: John Wiley, 2005.
Moon, U. C. and Lee, K. Y. "A boiler—turbine system control using a fuzzy auto-regressive moving average (FARMA) model," *IEEE Trans. Energy Convers.*, vol. 18, No. 1, pp. 142-148, Mar. 2003.
Norggaard, M. et al. *Neural Networks for Modeling and Control of Dynamic Systems*. London, U.K.: Springer-Verlag, 2000.
Pellegrinetti, G. and Bentsman, J. "Nonlinear control oriented boiler modeling—A benchmark problem for controller design," *IEEE Trans. Control Syst. Technol.*, vol. 4, No. 1, pp. 57-64, Jan. 1996.
Poncia, G. and Bittanti, S. "Multivariable model predictive control of a thermal power plant with built-in classical regulation," Int. J. Control, vol. 74, No. 11, pp. 1118-1130, 2001.
Rossiter, J. A. *Model-Based Predictive Control:-A-Practicat Approach*. New York: CRC, 2003.
Rajan, G. G. *Optimizing Energy Efficiencies in Industry*. New York: McGraw-Hill, 2003.
Seborg, D. E. et al. *Process Dynamics and Control*, 2nd ed. New York: Wiley, 2003.
Song, Z.. "Data Driven Power Plant Performance Optimization." Power Point Presentation, Iowa Energy Center, MidAmerican Energry, Intelligent Systems Lab, The University of Iowa, Jan. 20, 2009.
Srivastava, A. et al. "Virtual Sensors: Using Data Mining Techniques to Efficiently Estimate Remote Sensing Spectra." *IEEE Transactions on Geoscience and Remote Sensing* 43(3):590-600, Mar. 2005.
Taplin, H. *Combustion Efficiency Tables*. Lilburn, GA: Fairmont, 1991.
Tan, W. et al. "Analysis and control of a nonlinear boiler—turbine unit," *J. Process Control*, vol. 15, No. 8, pp. 883-891, 2005.
Tan, P. N. et al. *Introduction to Data Mining*. Reading, MA: Pearson Education/Addison Wesley, 2006.
Witten, I. H. and Eibe, F. *Data Mining: Practical Machine Learning Tools and Techniques*, 2nd ed. San Francisco, CA: Morgan Kaufmann, 2005.
Yu, D. and Xu, Z. "Nonlinear coordinated control of drum boiler power unit based on feedback linearization," *IEEE Trans. Energy Convers.*, vol. 20, No. 1, pp. 204-210, Mar. 2005.
Zheng et al. "Virtual Modeling of HVAC Sensors." Power Point Presentation, Intelligent Systems Laboratory, The University of Iowa, Oct. 6, 2008.

\* cited by examiner

| SYMBOL | DESCRIPTION |
|---|---|
| $C_i$ | THE $i^{th}$ CLUSTER |
| $c_i$ | THE CENTROID OF CLUSTER $C_i$ |
| $K$ | THE NUMBER OF CLUSTERS |
| $q_i$ | THE NUMBER OF POINTS IN $C_i$ |

| EXP DATA SET | START TIME STAMP | END TIME STAMP |
|---|---|---|
| 1 | 8/29/04 12:00 AM | 9/4/04 11:59 PM |
| 2 | 4/16/04 12:00 AM | 4/22/04 11:59 PM |
| 3 | 7/23/04 12:00 AM | 7/29/04 11:59 PM |
| 4 | 7/16/04 12:00 AM | 7/22/04 11:59 PM |
| 5 | 6/11/04 12:00 AM | 6/17/04 11:59 PM |
| 6 | 4/23/04 12:00 AM | 4/29/04 11:59 PM |
| 7 | 4/30/04 12:00 AM | 5/6/04 11:59 PM |
| 8 | 5/7/04 12:00 AM | 5/13/04 11:59 PM |
| 9 | 5/14/04 12:00 AM | 5/20/04 11:59 PM |
| 10 | 6/4/04 12:00 AM | 6/10/04 11:59 PM |

FIG. 3

| PROCESS VARIABLE | DESCRIPTION | PROCESS VARIABLE | DESCRIPTION |
|---|---|---|---|
| $u(1)$ | FEEDER A SPEED | $u(12)$ | LOWER DAMPER POSITION |
| $u(2)$ | FEEDER B SPEED | $u(13)$ | MILL A FUEL AIR DAMPER POSITION |
| $u(3)$ | FEEDER C SPEED | $u(14)$ | MILL B FUEL AIR DAMPER POSITION |
| $u(4)$ | FEEDER D SPEED | $u(15)$ | MILL C FUEL AIR DAMPER POSITION |
| $u(5)$ | AIR TEMP FROM PREHEAT COIL 1 | $u(16)$ | MILL D FUEL AIR DAMPER POSITION |
| $u(6)$ | AIR TEMP FROM PREHEAT COIL 2 | $u(17)$ | ID FAN A SPEED |
| $u(7)$ | RHTR WATER FLOW | $u(18)$ | ID FAN B SPEED |
| $u(8)$ | SHTR WATER FLOW | $v(1)$ | OUTSIDE AIR TEMP |
| $u(9)$ | BURNER TILT DEGREES | $v(2)$ | CIRCULATING WATER INLET TEMP |
| $u(10)$ | UPPER DAMPER POSITION | $x(1)$ | UNIT HEAT RATE |
| $u(11)$ | MIDDLE DAMPER POSITION | $x(2)$ | MEGAWATT LOAD |

FIG. 4

| LT_9000 | 9000_9375 | 9375_9750 | 9750_10125 | 10125_10500 |
|---|---|---|---|---|
| 10500_10875 | 10875_11250 | 11250_11625 | 11625_12000 | HT_12000 |

FIG. 5

| LT_40 | 40_45 | 45_50 | 50_55 | 55_60 | 60_65 | 65_70 |
|---|---|---|---|---|---|---|
| 70_75 | 75_80 | 80_85 | 85_90 | 90_95 | 95_100 | 100_105 |
| 105_110 | HT_110 | | | | | |

FIG. 6

| EXP DATA SET | AVERAGE UHR CHANGE | %CHANGE | # OF INSTANCES WITH DECREASED UHR | # OF INSTANCES CONTROLLED | HIT % |
|---|---|---|---|---|---|
| 1 | -161.38 | -1.56% | 1394 | 1437 | 97.00% |
| 2 | -336.71 | -3.52% | 325 | 354 | 91.81% |
| 3 | -45.4 | -0.45% | 799 | 1426 | 56.00% |
| 4 | 4.98 | 0.06% | 512 | 1439 | 35.58% |
| 5 | -53.34 | -0.53% | 1045 | 1328 | 78.69% |
| 6 | -130.87 | -1.27% | 480 | 543 | 88.39% |
| 7 | -157.29 | -1.56% | 1148 | 1212 | 94.70% |
| 8 | -97.4 | -0.96% | 1202 | 1403 | 85.67% |
| 9 | -112.07 | -1.13% | 822 | 823 | 99.87% |
| 10 | -33.25 | -0.34% | 944 | 1224 | 77.12% |

FIG. 7

| EXP DATA SET | AVERAGE UHR CHANGE | %CHANGE | # OF INSTANCES WITH DECREASED UHR | # OF INSTANCES CONTROLLED | HIT % |
|---|---|---|---|---|---|
| 1 | -145.02 | -1.40% | 1379 | 1437 | 95.96% |
| 2 | -113.72 | -1.12% | 225 | 354 | 63.56% |
| 3 | -70.41 | -0.70% | 1227 | 1426 | 86.04% |
| 4 | 2.46 | 0.03% | 543 | 1439 | 37.73% |
| 5 | -52.86 | -0.52% | 1041 | 1328 | 78.39% |
| 6 | -110.34 | -1.07% | 428 | 543 | 78.82% |
| 7 | -145.26 | -1.44% | 1098 | 1212 | 90.59% |
| 8 | -100.59 | -1.00% | 1209 | 1403 | 86.17% |
| 9 | -106.82 | -1.07% | 821 | 823 | 99.76% |
| 10 | -42.93 | -0.44% | 960 | 1224 | 78.43% |

FIG. 8

| EXP DATA SET | AVERAGE FEEDER SPEED CHANGE | %CHANGE | # OF CONTROLLED INSTANCES | # OF DECREASE MORE THAN 0.5 RPM |
|---|---|---|---|---|
| 1 | -0.35 | -1.83% | 800 | 261 |
| 2 | -1.21 | -3.44% | 1384 | 1104 |
| 3 | -2.68 | -7.34% | 1461 | 1115 |
| 4 | -0.86 | -2.65% | 1412 | 843 |
| 5 | -0.93 | -3.96% | 1315 | 903 |
| 6 | -0.39 | -1.49% | 1094 | 283 |
| 7 | -1.13 | -4.16% | 1273 | 1044 |
| 8 | -0.79 | -2.28% | 1368 | 868 |
| 9 | -0.64 | -1.81% | 1401 | 678 |
| 10 | -0.39 | -0.99% | 125 | 42 |

FIG. 9

| EXP DATA SET | AVERAGE FEEDER SPEED CHANGE | %CHANGE | # OF CONTROLLED INSTANCES | # OF DECREASE MORE THAN 0.5 RPM |
|---|---|---|---|---|
| 1 | -0.45 | -2.28% | 919 | 381 |
| 2 | -1.26 | -3.47% | 1406 | 1052 |
| 3 | -2.86 | -7.80% | 1275 | 1140 |
| 4 | -0.99 | -3.00% | 1412 | 887 |
| 5 | -0.72 | -3.05% | 1062 | 586 |
| 6 | -0.4 | -1.43% | 1235 | 351 |
| 7 | -1.06 | 3.90% | 1283 | 1037 |
| 8 | -0.81 | -2.34% | 1366 | 888 |
| 9 | -0.59 | -1.68% | 1408 | 611 |
| 10 | -0.41 | -1.04% | 162 | 53 |

FIG. 10

| EXP DATA SET | UHR OPTIMIZATION | | FER OPTIMIZATION | |
|---|---|---|---|---|
| | AVERAGE MW CHANGE | % CHANGE | AVERAGE MW CHANGE | % CHANGE |
| 1 | 6.63 | 11.78% | 0.61 | 1.15% |
| 2 | 11.47 | 18.23% | 1.84 | 2.30% |
| 3 | 5.32 | 5.80% | 2.17 | 2.11% |
| 4 | 3.94 | 4.77% | 1.02 | 1.08% |
| 5 | 3.99 | 5.98% | 1.17 | 1.50% |
| 6 | 2.33 | 3.64% | 1.16 | 1.47% |
| 7 | 4.09 | 5.34% | 1.63 | 2.03% |
| 8 | 1.61 | 1.78% | 1.04 | 1.15% |
| 9 | 0.95 | 1.04% | 0.72 | 0.76% |
| 10 | 6.19 | 6.80% | 0.6 | 0.51% |

FIG. 11

| EXP DATA SET | UHR OPTIMIZATION | | FER OPTIMIZATION | |
|---|---|---|---|---|
| | AVERAGE MW CHANGE | % CHANGE | AVERAGE MW CHANGE | % CHANGE |
| 1 | 4.77 | 7.79% | 1.07 | 1.85% |
| 2 | 8.38 | 13.39% | 1.58 | 1.83% |
| 3 | 2.08 | 2.45% | 2.33 | 2.29% |
| 4 | 3.9 | 4.72% | 1.04 | 1.11% |
| 5 | 3.99 | 5.99% | 1.14 | 1.55% |
| 6 | 2.11 | 3.25% | 1.24 | 1.42% |
| 7 | 3.33 | 4.52% | 1.69 | 2.10% |
| 8 | 1.41 | 1.51% | 1.02 | 1.12% |
| 9 | 0.995 | 1.09% | 0.79 | 0.83% |
| 10 | 5.5 | 5.96% | 0.65 | 0.55% |

FIG. 12

| PARAMETER | DESCRIPTION | UNIT |
|---|---|---|
| T | GENERATOR TORQUE | Nm |
| WS | WIND SPEED | m/s |
| P | POWER PRODUCED | kW |
| GS | GENERATOR SPEED | rpm |
| GBTA | GENERATOR BEARING A TEMPERATURE | °C |
| GBTB | GENERATOR BEARING B TEMPERATURE | °C |
| BPA1 | BLADE 1 PITCH ANGLE | ° |
| BPA2 | BLADE 2 PITCH ANGLE | ° |
| BPA3 | BLADE 3 PITCH ANGLE | ° |
| YE | YAW ERROR | ° |
| RS | ROTOR SPEED | rpm |

FIG. 13

| PARAMETER | DESCRIPTION | UNIT |
|---|---|---|
| AUD_IAQ_TEMP | AUDITORIUM TEMPERATURE FROM IAQ SENSOR | °C |
| AUD_IAQ_CO$_2$ | AUDITORIUM CO$_2$ FROM IAQ SENSOR | PPM |
| AUD_IAQ_RH | AUDITORIUM RELATIVE HUMIDITY FROM IAQ SENSOR | % RH |
| AUD_TEMP | CONTROLLABLE AUDITORIUM TEMPERATURE | °C |
| AUD_LITE | AUDITORIUM LIGHT LEVEL | FC |
| BAR-PRES | BAROMETRIC PRESSURE | BAR |
| OA-HUMD | RELATIVE HUMIDITY | % RH |
| OA-TEMP | DRY-BULB TEMPERATURE | °C |
| SOL-BEAM | DIRECT NORMAL SOLAR IRRADIATION | Btu/hr-ft$^2$ |
| SOL-HORZ | TOTAL HORIZONTAL IRRADIATION | Btu/hr-ft$^2$ |
| WIND-DIR | WIND DIRECTION | ° |
| WIND-VEL | WIND SPEED | MILE/HOUR |

FIG. 14

DATA-DRIVEN APPROACH TO MODELING SENSORS WHEREIN OPTIMAL TIME DELAYS ARE DETERMINED FOR A FIRST SET OF PREDICTORS AND STORED AS A SECOND SET OF PREDICTORS

CROSS REFERENCE TO RELATED PATENT APPLICATION

This application claims priority to U.S. Provisional Application No. 61/100,164 filed Sep. 25, 2008, herein incorporated by reference in its entirety.

FIELD

Embodiments of the invention relate, generally, to dynamic modeling and, in particular, to a data-driven approach for modeling sensors of non-controllable variables associated with a system.

BACKGROUND

Improving performance of a boiler-turbine unit is of interest to the energy industry due to increasing fuel costs. The system performance depends on the accuracy of models and the selected performance metrics.

Performance optimization of a boiler-turbine system is usually considered in two phases. The first is the design and implementation of a control system before the power plant becomes operational. The second is the use of the performance test code (e.g., American Society of Mechanical Engineers (ASME) performance test code) to periodically evaluate the system performance to update the operating parameters (set points) of the controllers. Kuprianov [13] discussed different objective functions to improve boiler thermal efficiency and reduce emissions based on certain test codes (or "a test code"). Farhad et al. [10] demonstrated the use of the ASME performance test code in reducing fuel and energy consumption.

Numerous modeling approaches of boiler-turbine systems have focused on using the first principle, e.g., thermodynamics. Researchers applied energy and material balance, material flow, and chemistry to derive models in the form of differential equations. Typical benchmark nonlinear models of boilers and turbines can be found in [2], [3], [8], and [22]. Ben-Abdennour and Lee [5] reported test results of a fuzzy fault accommodation controller. Moon and Lee [20] presented a fuzzy controller that can update the fuzzy rules adaptively by a simple set-point error-checking process. Espinosa et al. [9] applied fuzzy logic to identify the boiler-turbine system and implemented it to reduce overshooting and settling time. Yu and Xu [31] discussed the feasibility and efficacy of applying a feedback linearization technique to a nonlinear boiler-turbine model for control of steam pressure and electricity output. Tan et al. [28] attempted to determine control settings where distances between the nonlinear system and its corresponding linearization model were minimal; thus, the linear controller's performance was guaranteed.

Other applications of boiler-turbine control can be found in [17], [18], and [23]. The results published in the literature are not based on benchmark nonlinear boiler-turbine models. Fuzzy logic and autotuning techniques were used by [17]. A model predictive control approach [24] was illustrated in the papers by [18] and [23]. Such a technique generally uses an accurate model to predict the system behavior based on the changing inputs, and calls for the continuous solving of a quadratic programming optimization problem.

Although the literature reports progress in controlling boiler-turbine systems, the existing approaches usually are expensive to implement due to uncertainty involved in operating such systems. System errors accumulate due to the assumptions made in modeling. Also, control systems are usually designed to ensure system stability and fast response. System performance metrics, e.g., fuel consumption, are usually not well integrated in the control system. The performance test code is widely used to monitor performance; however, it involves a number of constants that are difficult to obtain, which may cause unreliable test results.

A need, therefore, exists for improved techniques for controlling boiler-turbine systems, as well as other systems, the performance of which is dependent upon non-controllable variables.

BRIEF SUMMARY

Embodiments of the present invention focus on metacontrol of a single boiler-turbine unit to reduce fuel consumption while satisfying megawatt load constraints. As one of ordinary skill in the art will recognize, controllers do not fully capture the boiler-turbine system dynamics due to process changes, e.g., boiler aging. Opportunities exist to adjust (bias) controllable parameters to improve performance. Embodiments described herein propose a data-driven approach to generate control settings to improve the performance of the boiler-turbine system.

In particular, according to one embodiment, two optimization models for improvement of the boiler-turbine system performance may be formulated. The models may be constructed using a data-mining approach. Historical process data may be clustered and the discovered patterns may be selected for performance improvement of the boiler-turbine system. The first model of embodiments described herein optimizes a widely used performance index, the unit heat rate. The second model minimizes the total fuel consumption while meeting the electricity demand. The strengths and weaknesses of the two models are discussed. An industrial case study illustrating the concepts is further presented.

While embodiments of the present invention described herein focus on controlling and improving performance of a boiler-turbine system, as one of ordinary skill in the art will recognize in light of this disclosure, embodiments described herein are general and allow for solving models with a variety of objectives and constraints. In particular, embodiments described herein provide a data-driven approach for developing virtual sensors for non-controllable parameters (e.g., wind speed, outside air temperature, river water temperature, $CO_2$, relative humidity, etc.) affecting any number of systems (e.g., a boiler-turbine system, a wind turbine, a Heating, Ventilation and Air Conditioning (HVAC) system, etc.). The output of these sensors may then be used, for example, to control the underlying system in order to optimize system performance.

In accordance with one aspect, a method is provided of optimizing a system by modeling non-controllable parameters affecting system performance. In one embodiment, the method may include: (1) receiving one or more historical values for each of a plurality of system parameters; (2) grouping the system parameters into controllable parameters, non-controllable parameters, and performance parameters; (3) determining a first set of predictors from the non-controllable parameters using the historical values of these non-controllable parameters; (4) for each predictor in the first set of predictors, determining one or more optimal time instances at which a value of each predictor in the first set of predictors is measured using non-uniform time scales; (5) storing the optimal time instances for each predictor in the first set of predictors as a second set of predictors; (6) establishing one or more constraints for each of the controllable parameters; (7) constructing a dynamic model based on the second set of predictors, the controllable parameters, and the performance parameters; and (8) optimizing the dynamic model with a non-gradient-based algorithm.

In accordance with another aspect, a computer program product is provided for optimizing a system by modeling non-controllable parameters affecting system performance. The computer program product contains at least one computer-readable storage medium having computer-readable program code portions stored therein. The computer-readable program code portions of one embodiment may include: (1) a first executable portion for receiving one or more historical values for each of a plurality of system parameters; (2) a second executable portion for grouping the system parameters into controllable parameters, non-controllable parameters, and performance parameters; (3) a third executable portion for determining a first set of predictors from the non-controllable parameters using the historical values of these non-controllable parameters; (4) a fourth executable portion for determining, for each predictor in the first set of predictors, one or more optimal time instances at which a value of each predictor in the first set of predictors is measured using non-uniform time scales; (5) a fifth executable portion for storing the optimal time instances for each predictor in the first set of predictors as a second set of predictors; (6) a sixth executable portion for establishing one or more constraints for each of the controllable parameters; (7) a seventh executable portion for constructing a dynamic model based on the second set of predictors, the controllable parameters, and the performance parameters; and (8) an eighth executable portion for optimizing the dynamic model with a non-gradient-based algorithm.

In accordance with yet another aspect, a system is provided for modeling non-controllable parameters affecting system performance. In one embodiment, the system may include a processor configured to: (1) receive one or more historical values for each of a plurality of system parameters; (2) group the system parameters into controllable parameters, non-controllable parameters, and performance parameters; (3) determine a first set of predictors from the non-controllable parameters using the historical values of these non-controllable parameters; (4) for each predictor in the first set of predictors, determine one or more optimal time instances at which a value of each predictor in the first set of predictors is measured using non-uniform time scales; (5) store the optimal time instances for each predictor in the first set of predictors as a second set of predictors; (6) establish one or more constraints for each of the controllable parameters; (7) construct a dynamic model based on the second set of predictors, the controllable parameters, and the performance parameters; and (8) optimize the dynamic model with a non-gradient-based algorithm.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

FIG. 3 is a table identifying experimental data sets considered in the boiler-turbine industrial case study described herein;

FIG. 4 is a table identifying the process variables of the data used in the boiler-turbine industrial case study described herein;

FIG. 5 is a table identifying the categories into which the unit heat rate (UHR) was divided in the boiler-turbine industrial case study described herein;

FIG. 6 is a table identifying the levels into which the megawatt load was categorized in the boiler-turbine industrial case study described herein;

FIG. 7 is a table illustrating the results of UHR optimization with $\lambda=0.05$ in the boiler-turbine industrial case study described herein;

FIG. 8 is a table illustrating the results of UHR optimization with $\lambda=0.07$ in the boiler-turbine industrial case study described herein;

FIG. 9 is a table illustrating the results of FER optimization with $\lambda=0.05$ in the boiler-turbine industrial case study described herein;

FIG. 10 is a table illustrating the results of FER optimization with $\lambda=0.07$ in the boiler-turbine industrial case study described herein;

FIG. 11 is a table providing a comparison of the absolute megawatt load changes based on UHR and FER optimization with $\lambda=0.05$ in the boiler-turbine industrial case study described herein;

FIG. 12 is a table providing a comparison of the absolute megawatt load changes based on UHR and FER optimization with $\lambda=0.07$ in the boiler-turbine industrial case study described herein;

Figure 15:
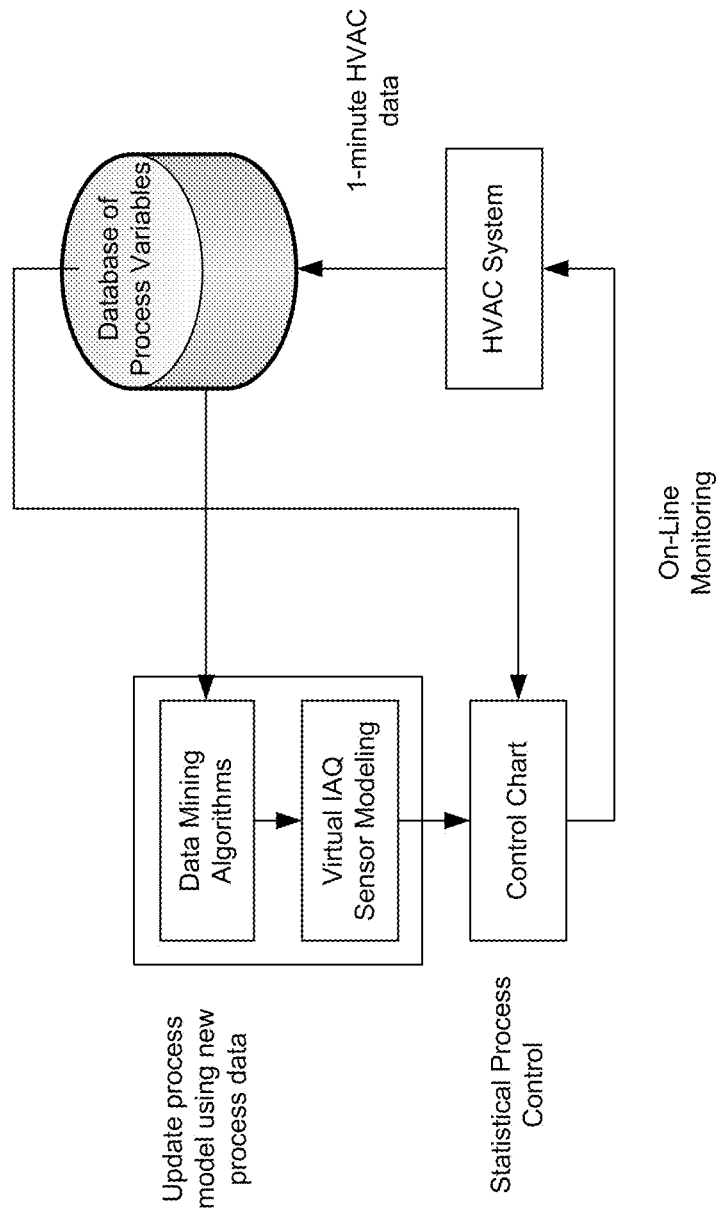
Figure 16:
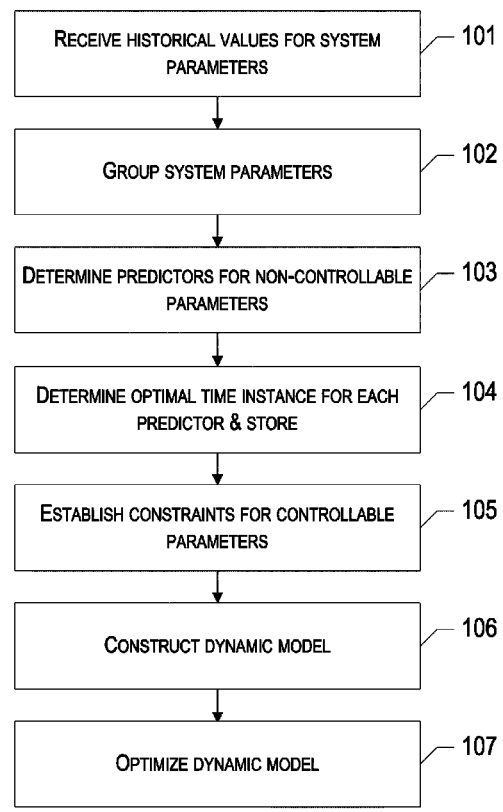
Figure 17:
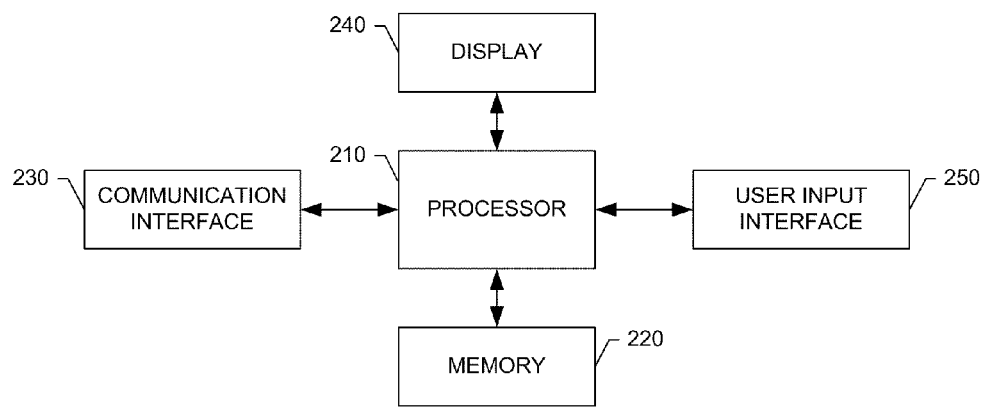

FIG. 13 lists parameters for which historical data may be collected for a wind turbine system in order to generate a dynamic model in accordance with embodiments described herein;

FIG. 14 lists parameters for which historical data may be collected for a Heating, Ventilation and Air Conditioning (HVAC) system in order to generate a dynamic model in accordance with embodiments described herein;

FIG. 15 is a block diagram illustrating basic concept of indoor air quality (IAQ) sensor modeling and on-line monitoring in accordance with an embodiment of the present invention;

FIG. 16 is a flow chart illustrating a method of creating a dynamic model for use in optimizing the performance of various types of systems in accordance with embodiments of the present invention;

FIG. 17 is a schematic block diagram of an entity capable of generating a dynamic model based on data-mining algorithms in accordance with embodiments described herein.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein;

rather, these embodiments are provided so that this disclosure will satisfy applicable legal requirements. Like numbers refer to like elements throughout.

Optimization Models and Performance Metrics

A. Performance Criteria

Before the optimization models of embodiments of the present invention are presented, three performance metrics are discussed. A performance criterion directly impacts the optimization result. A widely used metric for boiler-turbine unit (steam turbine) performance is the unit heat rate (UHR) in $$UHR = \frac{\text{Heat Input Rate to Turbine}}{\text{Generator Electricity Output} \times BE}$$  (1)

where the boiler efficiency (BE) is calculated from the heat-loss metric [25], [27]9

$$BE(\%) = 100\% - \text{Boiler Heat Loss} \%.$$  (2)

A lower value of the UHR implies higher boiler-turbine system performance. Equations (1) and (2) call for accurate values (calculated or measured) of the heat input (e.g., the heat contained in the fuel, the heat of the entering air) and accurate values of various heat losses [25], e.g., the heat loss due to dry gas or heat loss due to the moisture in fuel. As one of ordinary skill in the art will recognize, the UHR and BE are susceptible to errors in real industrial environments.

Besides the UHR, another performance metric is used in the electric power industry, the fuel electricity rate (FER), which is the ratio of fuel British Thermal Unit (Btu) rate (Btu/h) and the electricity produced by a generator (in megawatt), as shown in $$FER = \frac{\text{Fuel BTU Rate}}{\text{Electricity Output}}.$$  (3)

A power plant may use different types of fuel (e.g., coal and biomass) with varied Btu content, which is suitably captured by the numerator of (3). It is also easy to see from (3) that a low FER value of the boiler-turbine system is desired. Thus, for a fixed load (electricity produced), a boiler-turbine unit with lower FER burns less fuel. Note that (3) involves two parameters, the electricity output that is accurately measured, and the fuel Btu rate, which can be accurately estimated.

B. Optimization Models

According to embodiments described herein, optimizing a boiler-turbine unit may be essentially equivalent to solving a metacontrol problem, wherein the solution provides values of controllable variables, such as feeder speed, fan speed, preheat coil temperature, and so on.

Assume a boiler-turbine system can be described by a triplet (u, x, v), where $u \in R^l$ is a vector of l controllable variables, $v \in R^m$ is a vector of m noncontrollable variables (e.g., outside air temperature, river water temperature), and $x \in R^k$ is a vector of k system state variables (e.g., temperature, megawatt load, UHR, and turbine heat rate) [6], [26]. Most state variables are measured, but some are calculated. The state variables are also called response variables, as they change according to the changes of controllable and noncontrollable variables. Highly correlated state variables can be removed from consideration due to the redundant information.

Assume that the boiler-turbine system is represented as x=ƒ(u, v), where ƒ(.) is a function capturing the process in the steady state [26]. The x=ƒ(u, v) can be also expressed as: x(1)=ƒ₁(u, v), x(2)=ƒ₂(u, v), . . . , x(k)=ƒₖ(u, v).

Let=$[0\ 0\ 0\ \ldots\ 1\ \ldots\ 000]_{l \times k}$ be a vector projecting x into the desired performance metric, such as the UHR or FER, thus Cx=Cƒ(u, v). Similarly, matrix D with a suitable dimension can be defined to extract or linearly combine all the other state variables needed to be constrained except for the desired performance metric, Dx=Dƒ(u, v). The state variables include megawatt load, steam pressure, and so on.

In one embodiment, the boiler-turbine performance optimization model may be formulated next.

Model 1

$$\underset{u}{\operatorname{argmin}}\ Cf(u,v)$$  (4)

s.t. $u \in U$ $Df(u, v) \in X_D$ where U and $X_D$ are the constraint set of controllable variables and the constraint set state variables, respectively. For example, the feeder speed may be limited by its designed capacity, and megawatt load may be determined by a contract.

Model 1 can accommodate the previously discussed performance criteria and can be expressed in the following two different forms:

Model 2 (UHR optimization)

$$\underset{u}{\operatorname{argmin}}\ UHR(u, v)$$  (5)

s.t. $u \in U$ $Df(u, v) \in X_D$

Model 3 (FER optimization)

$$\underset{u}{\operatorname{argmin}}\ FER(u, v)$$  (6)

s.t. $u \in U$ $Df(u, v) \in X_D$

In practice, performance optimization of the boiler-turbine has to be considered for a fixed electricity output in a steady state. Thus, Model 3 can be transformed to minimize the fuel Btu rate (fuel input) subject to load demand.

Model 4 (FER optimization)

$$\underset{u}{\operatorname{argmin}}\ \text{Fuel Btu Rate}\ (u, v)$$  (7)

s.t. $u \in U$ $Df(u, v) \in X_D$

Figures 1, 2:
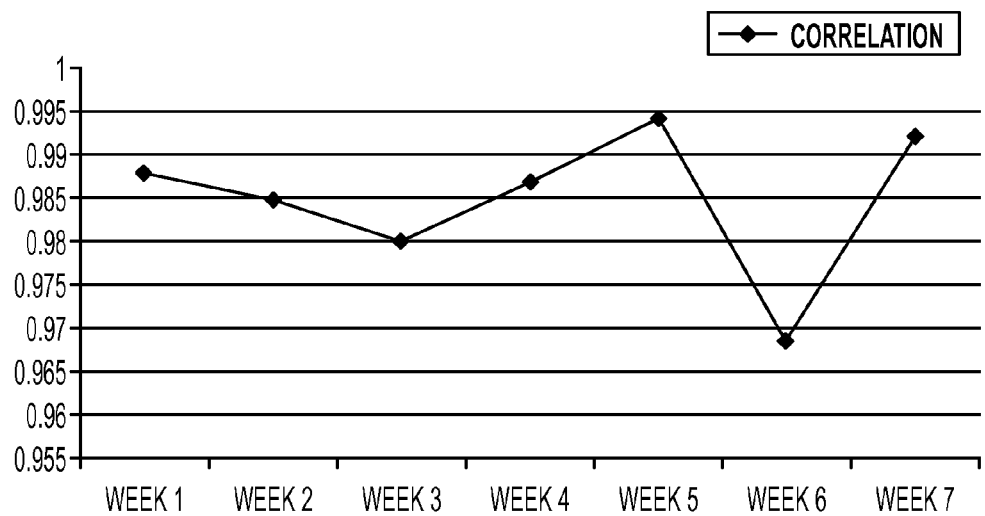
FIG. 1 illustrates the correlation between the total feeder speed of a boiler and the heat input in a turbine of a boiler-turbine system associated with one embodiment described herein.
FIG. 2 is a table identifying the notation used in a K-means clustering algorithm associated with one embodiment described herein.

The fuel Btu rate can be inferred from the feeder speed and other fuel-related parameters. A practical issue may arise here as to whether the total feeder speed is a good indication of the fuel Btu rate. One way to resolve this issue is to determine a correlation between the total feeder speed and the heat input to the turbine. High total feeder speed should lead to more heat into the boiler, and thus, more heat to the turbine. FIG. 1 shows the correlation between the total feeder speed of the boiler and heat input into the turbine. Seven data sets were randomly selected, each with 10 080 data points (1 week of data). As shown, the total feeder speed and the heat input to the turbine are highly correlated. Thus, the total feeder speed is a good approximation of the total fuel input to the boiler.

Solving Model 4 optimally guarantees the minimum fuel input. However, the solution of Model 2 does not guarantee the minimum fuel input, rather the minimum UHR. Also, the speed of fuel input can be relatively easily estimated from the speed of the fuel feeder. Note that the computed values of the UHR may involve large errors.

Data-Driven Methods

Analytical models of boiler performance are highly nonlinear, yet, modeling $f(.)$ is important for real-time optimization. Optimal solving of such models with classical optimization algorithms (e.g., nonlinear programming) may be computationally expensive, especially since the models need be solved repeatedly for continuous performance improvement.

Data-driven models offer a viable alternative to analytical modeling. Among them, neural networks and fuzzy logic have found some applications [9], [11], [21]. Data-mining algorithms [30] are the latest addition to the data-driven methods of interest to the power industry. Some of the applications of data mining in the power industry are discussed in [7] and [14]-[16].

Both neural networks and fuzzy logic are good candidates for approximating and controlling nonlinear systems [9], [21]. However, the limiting factor of neural networks is a long training time when modeling large-scale and time-shifting processes. The main power of fuzzy logic modeling lies in its transformation of linguistic expressions into numeric values.

According to embodiments of the present invention, Models 2 and 4 may be solved by direct search of the centroid space. The analytical function $f(.)$ is not required by this clustering-based approach. Historical process data may be clustered, and patterns leading to high performance may be stored. These patterns (cluster centroids) may further be selected based on the current process's status and other operational constraints. The global optimum is not guaranteed; however, local optima leading to improved performance can be determined.

In one embodiment, this data-driven approach may involve first denoting the high-dimensional data point recorded at time t from the boiler-turbine system as $Pt=[x(1)_t, \ldots, x(k)_t, u(1)_t, \ldots, u(l)_t, v(1)_t, \ldots, v(m)_t]^T$, where $x(1)_t$ is the first state variable's value at time t, $u(1)_t$ and $v(1)_t$ are controllable and noncontrollable variables, respectively, and the total dimension of the data point is (k+l+m). Later $x(1)_t$ becomes the performance index UHR, and $x(2)_t$ denotes the megawatt load. To simplify the discussion, megawatt load is the only state variable to be constrained. However, as one of ordinary skill in the art will recognize in light of this disclosure, embodiments of the present invention may be easily generalizable to multiple constraints.

According to one embodiment, the historical training data set is $\{Pt_0, Pt_1, Pt_2, \ldots, Pt_n\}$ collected over a time horizon governed by the function $f(.)$. The K-means clustering algorithm [19], [29] applied to the training data, produces a set of centroids capturing patterns corresponding to this function. FIG. 2 is a table presenting the notation used in the K-means clustering algorithm of embodiments described herein. The basic steps of the K-means algorithm based on the notation presented in FIG. 2 are as follows:

1) Select K points as initial centroids given a set of points;
2) Repeat;
3) Form K clusters by assigning each point to its closest centroid;
4) Recompute the centroid of each cluster;
5) Until the centroids do not change.

The centroid of a cluster $C_i$ may be computed as $$c_i = \frac{1}{q_i} \sum_{P_t \in c_i} P_t.$$

The radius of a cluster $C_i$ may be computed from $$r_i = \sqrt{\frac{1}{q_i} \sum_{P_t \in c_i} (P_t - c_i)^2}.$$

Each cluster is composed of "similar" data points.

Let the centroids set be $\{c_1, c_2, c_3, \ldots, c_K\}$, where $c_1 = [x(1)_{c1}, \ldots, x(k)_{c1}, u(1)_{c1}, \ldots, u(l)_{c1}, v(1)_{c1}, \ldots, v(m)_{c1}]^T$. More details about K-means clustering and how to form centroids can be found at [29]. Basically, embodiments described herein assume that $x_c \approx f(u_c, v_c)$ holds for centroids with bounded errors, where $x_c$ represents the response variables of the centroid c, and $u_c$ and $v_c$ are the controllable and noncontrollable variables of the centroid c.

The following observation may be made: Let the points in $\{P_1, P_2, P_2, \ldots, P_n\}$ belong to centroid c, the centroid $$c = (1/n) \sum_{i=1}^{n} P_i,$$

and the error between $x(1)_c$ and $f_1(u_c, v_c)$ is bounded, if $f_1$ is continuously differentiable at each point of an open set $S \subset R^{m+l}$.

The following provides a proof of this observation. From the definition of K-means algorithm, $$x(1)_c = (1/n) \sum_{i=1}^{n} x(1)_i = (1/n) \sum_{i=1}^{n} f_1(u_i, v_i),$$

where $u_i$ and $v_i$ are the controllable and noncontrollable components of point Pi.

Therefore $$\varepsilon = x(1)_c - f_1(u_c, v_c)$$

$$= (1/n) \sum_{i=1}^{n} f_1(u_i, v_i) - f_1(u_c, v_c)$$

$$= (1/n) \sum_{i=1}^{n} [f_1(u_i, v_i) - f_1(u_c, v_c)].$$

For simplicity, (u, v) is denoted as variable ω, and then $$\varepsilon = (1/n) \sum_{i=1}^{n} [f_1(\omega_i) - f_1(\omega_c)].$$

Apply the mean-value theorem [12], $$(1/n)\sum_{i=1}^{n}[f_1(\omega_i) - f_1(\omega_c)] = (1/n)\sum_{i=1}^{n}\left[\frac{\partial f_1}{\partial \omega_{\omega=a_i}}(\omega_1 - \omega_c)\right],$$

where $a_i$ is a point on the line segment joining $\omega_i$ and $\omega_c$. Then $$|\varepsilon| = \left|\left(\frac{1}{n}\right)\sum_{i=1}^{n}\left[\frac{\partial f_1}{\partial \omega_{\omega=a_i}}\left(\frac{\omega_1 -}{\omega_c}\right)\right]\right| \leq \sqrt{\frac{\sum_{i=1}^{n}\left[\frac{\partial f_1}{\partial \omega_{\omega=a_i}}\left(\frac{\omega_1 -}{\omega_c}\right)\right]^2}{n}}.$$

Let $\varphi^2 = \max_{i=1,\ldots n}\left\{\left(\frac{\partial f_1}{\partial \omega_{\omega=a_1}}\right)^2\right\}, \varphi \geq 0$, $$\sqrt{\frac{\sum_{i=1}^{n}\left[\frac{\partial f_1}{\partial \omega_{\omega=a_i}}(\omega_1 - \omega_c)\right]^2}{n}} \leq \sqrt{\frac{(\varphi^2 \sum_{i=1}^{n}(\omega_1 - \omega_c)^2)}{n}} = r\varphi$$

where $$r = \sqrt{\frac{\left(\sum_{i=1}^{n}(\omega_1 - \omega_c)^2\right)}{n}}$$

As shown, the error $\varepsilon$ is bounded by $\phi$, the maximum absolute gradient of the function $f_1$, and r, the cluster's radius projected on the (u, v) dimensions. By varying the radius of the cluster C, reasonable accuracy can be produced. An increase in the number of clusters K generally decreases the cluster radius. Based on the observation discussed above, the errors between $x_c$ and $f(u_c, v_c)$ are also bounded.

Suppose current boiler-turbine system steady status is $P_t$. To minimize $x(1)_t$ and satisfy the megawatt load constraint (assume the load demand is M), according to one embodiment the centroids set may be searched and the centroid c with the minimum $x(1)_c$ and $x(2)_c = M$ with some acceptable tolerance may be found. After changing the controllable variables from $u_t$ to $u_c$, $x_t$ should change toward $x_c$ if the distance between $v_t$ and $v_c$ is small. However, in a dynamic system, the system's current states may impact the desired states. Thus, the distance between $x_t$ and $x_c$ may be considered in the search process. Making large changes in the system input may not be desired. Thus, the distance between $u_t$ and $u_c$ may also be considered. The Euclidean distance, i.e., $$\|u_t - u_c\| = \sqrt{\sum_{i=1}^{l}(u(i)_t - u(i)_c)^2}, \|v_t - v_c\|$$

$$= \sqrt{\sum_{i=1}^{m}(v(i)_t - v(i)_c)^2}$$

$$\|x_t - x_c\| = \sqrt{\sum_{i=1}^{k}(x(i)_t - x(i)_c)^2}$$

has been selected as the preferred metric. The weighted Euclidean distance can be considered if the weights are needed to differentiate the importance of individual variables.

According to embodiments described herein, the process of minimizing the boiler-turbine performance criterion may involve searching the nearest centroid with small $x(1)_c$ and satisfying all the constraints. Note that the clustering method may learn the patterns from historical data, and therefore, each centroid's controllable settings may be feasible. For FER optimization (Model 4), the search can be simplified to finding the nearest centroid satisfying all the constraints and with a smaller fuel input speed. Searching time in a centroid space is short, and this optimization process can be performed repeatedly, thus continuously improving the boiler-turbine performance.

Industrial Case Study

The data used in the project described below was generated from a 140-MW tangentially-fired boiler, 860 000 lbs/h, 2050 psi superheat, 759 000 lbs/h reheat, 1005° F./1005° F. superheat/reheat temperatures.

Ten data sets were considered for the different experiments, each including 10 080 data points (7 days, see FIG. 3). The raw data recorded from the boiler-turbine system was denoised and scaled. Other data preprocessing techniques can be applied to improve the quality of the data. FIG. 4 identifies the process variables of the industrial data set used in this embodiment of the present invention. In this embodiment, the target constrained response variable is the megawatt load.

To validate the proposed K-means clustering-based methods for optimizing a boiler-turbine performance, a virtual testing technique [16] was used for industrial data. An industrial data set collected for a period of 7 days at 1-min intervals was used. The data collected over the first 6 days (a training data set) was used to construct a centroids set. According to one embodiment, for each $P_t=[x_t, u_t, v_t]^T$ of the 1440 data points of the 7th day, centroid c may be retrieved from the Centroids set based on some criteria (see Models 5 or 6). Then, values $u_t$ may be substituted with $u_c$ (i.e., $P_t=[x_t, u_c, v_t]^T$). Suppose the process model $f(.)$ is known. Then, $x_t$ may be compared with $f(u_c, v_t)$ to see whether the performance is improved while the constraints are satisfied.

In this industrial case study, a neural network (NN) approach was used to capture the process model $f(.)$ from the 7-day data set. Two NNs were trained, one to capture the function $x(1)=f_1(u(1), \ldots, u(18), v(1), v(2))$, the other to capture the function $x(2)=f_2(u(1), \ldots, u(18), v(1), v(2))$. The function $f_1$ was used to predict whether the UHR would be reduced after applying the derived control settings. The function $f_2$ was used to predict whether the megawatt load would exceed the demand constraint. In this industrial case study, the megawatt load had to be constrained within demand±1 MW. In the test, the demand was assumed to be equal to a testing data point's megawatt load on the 7th day.

A. Optimization of the UHR

In one embodiment, to optimize the UHR in a centroids space, Model 2 may be instantiated as Model 5.

Model 5

$$\operatorname*{argmin}_{c \in Centroids} |c - P_t| \quad (8)$$

s.t. $x(1)_c < x(1)_t$ $|x(2)_c - x(2)_t| \leq 1$ $|v(1)_c - v(1)_t| = 0, |v(2)_c - v(2)_t| = 0.$ At time t, the current process status is $P_t$. Optimization of Model 5 may involve finding in the Centroids set $\{c_1, c_2, c_3, \ldots, c_K\}$ centroid c minimizing the distance between c and $P_t$ subject to various constraints. The searched centroid results in lower UHR than the one of $P_t$. The centroids $\{c_1, c_2,$ $c_3, \ldots, c_K\}$ may be extracted with the K-means algorithm applied to the training data set (the 6-day data set).

In computational experiments, the training data set was categorized into a number of subtraining data sets based on the UHR. Based on the domain expertise, the UHR was divided into ten categories (see FIG. 5). "LT_9000" means the UHR is lower than 9000, "9000_9375" means the UHR is greater than or equal to 9000, less than 9375.

The heuristic procedure of solving Model 5 for each point of the 7th day may be as follows.

Step 1) Divide the 7-day data set (data set 1) into two data sets (data sets 2 and 3). Data set 2 consists of the day 1-day 6 data points. Data set 3 includes the 7th day data points.

Step 2) Categorize data set 2 into ten subsets based on the UHR levels, i.e., for each UHR level, there is a corresponding data set.

Step 3) For each subset, with K=λ multiplied by the number of data points in the subset, apply the K-means algorithm to extract centroids; store them into the Centroids set.

Step 4) For each data point in data set 3, select centroids which satisfy the first two constraints of Model 5, then among those centroids, select a nearest centroid for the point and use the controllable variables' setting of the centroid to update the point's controllable variables. Save this "controlled" data point in the controlled data set.

Note that the equality constraints in Model 5 are not necessarily satisfied in the experiments, otherwise, there would not be enough data points to be controlled. Here, λ is the clustering ratio heuristically determining the number of clusters.

B. Optimization of the Fuel Electricity Rate

The objective function of Model 4 is to minimize the fuel Btu rate input to the boiler for the four feeders. For FER optimization, the research question can be stated as follows "Given a megawatt, can one determine a smaller total feeder speed?" In many boiler-turbine control systems, overshooting is common due to the changing combustion and energy transformation processes. For example, previously calculated boiler air and fuel controller parameters may no longer be valid. In this case study, each of the four feeders had a maximum speed of 10.25 RPM (rotations per minute). Next, Model 4 may be instantiated as Model 6.

Model 6

$$\operatorname*{argmin}_{c \in Centroids} |c - P_t| \quad (9)$$

$$\text{s.t. } \sum_{i=1}^{4} u(i)_c < \sum_{i=1}^{4} u(i)_t$$

$$|x(2)_c - x(2)_t| \leq 1$$

$$|v(1)_c - v(1)_t| = 0, |v(2)_c - v(2)_t| = 0$$

To simplify computation, the megawatt load was categorized into different levels shown in FIG. 6. The boiler-turbine unit in this case study has a maximum load of 120 MW. It usually runs between 40 MW and 110 MW. The category "LT_40" means lower than 40 MW, "HT_110" means higher than 110 MW, and "40_45" means higher than 40 MW, smaller than or equal to 45 MW.

The heuristic procedure for clustering-based FER optimization may be as follows.

Step 1) Divide the 7-day data set (data set 1) into two data sets (data sets 2 and 3). Data set 2 consists of the day 1-day 6 data points. Data set 3 consists of the 7th day data points.

Step 2) Categorize data set 2 into 16 subsets based on the megawatt levels, i.e., each megawatt load level is associated with a corresponding data set.

Step 3) For each subset, with K=λ multiplied by the number of data points in the subset, apply the K-means algorithm to extract centroids, store them into the Centroids set.

Step 4) For each data point in data set 3, select out centroids that satisfy the first two constraints in Model 6. Then, among those centroids, select a nearest centroid for the point and use the controllable variables' setting of the centroid to update the point's controllable variables. Save this "controlled" data point in the controlled data set.

Note that the satisfaction of the equality constraints of Model 6 is not guaranteed, as there might not be enough data points to be controlled.

C. Comparison of the Results and Discussion

The two controlled data sets for UHR and FER optimization were evaluated for opportunities to reduce the UHR or total feeder speed for the fixed megawatt load. One concern was whether the UHR would decrease for the fixed megawatt load. Such a concern did not apply to the FER optimization, as the total feeder speed was controllable. The only concern was to satisfy the megawatt load constraint.

FIGS. 7 and 8, respectively, illustrate the results of the UHR optimization for the controlled data set. For example, in the data set of 1440 instances (data points), the procedure described above for solving Model 5 in order to optimize UHR identified 1437 data points on the 7th day for Experiment 1. These points could be controlled to lower the UHR for a fixed megawatt load. An NN was used to predict the UHR of the controlled 1437 data points. The average UHR change for 1437 data points was 161.38. From FIG. 7, 1394 of the 1437 controlled data points in Experiment 1 resulted in a lower UHR. The remaining ones predicted a somewhat higher UHR. This implies that after the controllable variables were modified according to the computed centroid, the UHR could increase. The "Hit %" in FIG. 7 refers to the percentage of the controlled data points with a decreased UHR. The "% Change" expresses the relative average change of the UHR based on the original UHR.

FIGS. 9 and 10, respectively, illustrate the results of the FER optimization for a controlled data set. In Experiment 1 of FIG. 9, 800 data points were identified by the procedure described above for clustering-based FER optimization. Each data point was controlled with a decreased total feeder speed. The average total feeder speed was decreased by 0.35. The "% Change" reflects the average relative change of the total feeder speed based on the original total feeder speed.

FIGS. 7-10 show that there are significant opportunities to decrease the UHR or the total feeder speed from the industrial data sets.

FIGS. 11 and 12, respectively, compare the absolute megawatt load changes based on the two optimization models. The adjusted controllable variables have led to the megawatt load changes according to the underlying combustion and energy conversion principles. As shown, the UHR optimization model leads to larger load changes. The FER model could satisfy the ±1 MW constraint. Increasing the clustering ratio λ from 0.05 to 0.07 decreases the load changes in UHR optimization. One reason is that increasing the number of clusters decreases the clusters' radius, thus improving the prediction accuracy of a centroid based on the observation described above. Increasing λ does not significantly affect the load changes in the FER optimization. The reason is that in the procedure described above for clustering-based FER optimization, the data sets were already classified based on the load intervals. Thus, each data set to be clustered had more homogeneous data points in terms of the load distribution. However, for the UHR optimization procedure, data sets were classified based on the UHR intervals. Each data set had much variability of load distribution.

Other Use Cases:

As noted above, while the foregoing describes embodiments of the present invention in relation to optimizing boiler-turbine systems, the data-driven approach described herein is general and allows for solving models with a variety of objectives and constraints. In other words, embodiments of the present invention may be used to generate optimization models associated with a variety of systems including, for example, boiler-turbine systems, wind turbines, Heating, Ventilation and Air Conditioning (HVAC) systems, and/or the like. The following provides a few examples of how embodiments of the present invention may be used with other types of systems.

Wind Turbines

In one embodiment, the data-driven approach of embodiments described herein may be used for the development of a virtual wind speed sensor for wind turbines. In this embodiment, the virtual wind speed sensor may be built from historical wind farm data collected, for example, by the Supervisory Control and Data Acquisition (SCADA) system. As shown in the list of parameters provided in FIG. 13, the data collected may include, for example, generator torque, wind speed, power produced, generator speed, generator bearing, blade pitch angle, yaw error, rotor speed, and/or the like. A number of different data-mining algorithms may be used, in the manner described above, to develop models using the wind speed data collected by anemometers of various wind turbines on the wind farm. In one embodiment, wavelets may be employed to denoise the high-frequency wind speed data measured by the anemometers.

In particular, as one of ordinary skill in the art will recognize, the dynamics of the relationships between the wind speed measured at a turbine and its other SCADA parameters is complex. According to embodiments of the present invention, development of a quality model for wind speed prediction based on high-dimensional SCADA data can be accomplished with data-mining algorithms.

A process can be considered as a dynamic system changing over time. According to embodiments described herein, the concept of dynamic modeling may be used to build a virtual sensor of wind speed. Assume system parameter $y(t)$ can be determined based on the previous system status:

$$y(t-1), \ldots, y(t-d_y), x_1(t-1), \ldots, x_1(t-d_{x1}), \ldots, x_k(t-1), \ldots, x_k(t-d_{xk}).$$

The positive integers $d_y, d_{x1}, \ldots, d_{xk}$ are the maximum possible time delays to be considered for the corresponding variables. The dynamic model of the wind speed sensor may be extracted from the historical process data by data-mining algorithms.

Selecting appropriate predictors for the dynamic model is important to the performance of the wind speed sensor model, and data-mining algorithms can perform feature selection. The boosting tree [32, 33] algorithm can compute predictor importance and select important features for modeling, while the wrapper approach combined with a genetic random search [9, 34] could select the best predictor sets. For dependent (response) variable $y(t)$, the most important predictors among $y(t), y(t-1), \ldots, y(t-d_y), x_1(t), x_1(t-1), \ldots, x_1(t-d_{x1}), \ldots, x_k(t), x_k(t-1), \ldots, x_k(t-d_{xk})$ are selected.

For ease of discussion, different index sets of y need to be defined:

Definition.

For response (or dependent) variable $D_y = d_y^{low}, \ldots, d_y^{high}$ is a set composed of integers selected from $1, \ldots d_y$ related to y's previous values and arranged in ascending sequence, $d_y^{low} \leq d_y^{high}$. Similarly, $D_{x1} = d_{x1}^{low}, \ldots, d_{x1}^{high}$ is a set selected from $1, \ldots, d_{x1}$ for predictors related to $x_1$, and $D_{xk} = d_{xk}^{low}, \ldots, d_{xk}^{high}$ is a set selected from $1, \ldots, d_{x1}$ for predictors related to $x_k$. In total there are k+1 individual sets for y: $D_y, D_{x1}, D_{xk}$.

Based on the definition above, the response variable y can be expressed as the following dynamic model:

$$y(t) = f(y(t-d)_{d \in D_y}, x_1(t-d)_{d \in D_{x1}}, \ldots, [x_k(t-d)]_{d \in xk}) \quad (10)$$

where $y(t-d)_{d \in D_y}, x_1(t-d)_{d \in D_{x1}}, \ldots, [x_k(t-d)]_{d \in xk}$ involves all possible elements in the corresponding sets. In Eq. (10) y is the dependent (response) variable wind speed, and x are the SCADA parameters used in this dynamic model as predictors. The x parameters (e.g., generator torque, rotor speed, and so on) are listed in FIG. 13. The function $f(.)$ may be learned with the historical SCADA data by data-mining algorithms.

The selection of an appropriate data-mining algorithm for building a dynamic model (Eq. (10)) of the wind speed sensor is important. Two basic metrics, the MAE (mean absolute error) and Std (standard deviation of absolute error) can be used to compare the performance of various data-mining algorithms and models. The AE (absolute error), MAE (mean absolute error), and the Std (standard deviation) are expressed in Eq. (11) to (13).

$$AE = |\hat{y} - y| \quad (11)$$

$$MAE = \frac{\sum_{i=1}^{N} AE(i)}{N} \quad (12)$$

$$Std = \sqrt{\frac{\sum_{i=1}^{N} (AE(i) - MAE)^2}{N-1}} \quad (13)$$

where $\hat{y}$ is the predicted wind speed, y is the observed (measured by mechanical anemometer) wind speed value, and N is the number of test data points used to validate the performance of the wind speed sensor model. The small value of the MAE and Std implies a superior prediction performance of the wind speed sensor model.

According to embodiments of the present invention, the models built with data-mining algorithms based on the wavelet-transformed data described above may serve as virtual wind speed sensors for wind turbines. According to embodiments described herein, the wind speed generated by the virtual sensor can be used for different purposes, including on-line monitoring and calibration of the wind speed sensors, as well as providing reliable wind speed input to a turbine controller. As one of ordinary skill in the art will recognize, embodiments described herein may be applicable to utility-scale wind turbines of any type.

HVAC Systems

In another embodiment the data-driven approach described above may be used for modeling indoor-air quality (IAQ) sensors used in HVAC systems. In this embodiment, the IAQ sensors may measure temperature, $CO_2$, and/or relative humidity. As above, a number of models predicting values of IAQ parameters may be built with various data-mining algorithms. According to one embodiment, the models built with data-mining algorithms can serve as virtual IAQ sensors in buildings and be used for on-line monitoring and calibration of the IAQ sensors. As one of ordinary skill in the art will recognize in light of this disclosure, the approach of embodiments of the present invention can be applied to HVAC systems in any type of building.

More specifically, according to one embodiment of the present invention, for each room/building of interest data may be collected for the same set of IAQ parameters, temperature, $CO_2$, and relative humidity, as well as other parameters, such as those listed in FIG. 14. The first three parameters in FIG. 14 are the indoor air quality parameters that may be collected from the IAQ sensors, for example, in an auditorium; the last eight parameters indicate the outside weather conditions.

Data mining algorithms may be used to build models for the IAQ sensors in the HVAC system. Virtual IAQ sensor modeling may use other HVAC parameters as predictors to predict IAQ parameters as dependent, and the IAQ parameters may include temperature, $CO_2$ and relative humidity. The relationship between IAQ parameters and various other HVAC parameters are complicated, and thus it is hard to identify the model and accurately predict IAQ parameters with high-dimension HVAC parameters as input using mathematical modeling. However, data mining is a powerful tool in extracting knowledge from voluminous data.

A virtual IAQ sensor model represents the underlying function between the IAQ parameter and the other HVAC parameters. Eq. (14) to (16) show the sensor models for predicting temperature, $CO_2$ and relative humidity, respectively, in accordance with an embodiment of the present invention.

$$y_{Aud\_IAQ\_CO2} = f(x_{Aud\_IAQ\_Temp}, x_{Aud\_IAQ\_RH}, v_{Aud\_Temp}, v_{Aud\_Lite}, v_{BAR-PRES}, v_{OA-HUMD}, v_{OA-TEMP}, v_{SOL-BEAM}, v_{SOL-HORZ}, v_{WIND-DIR}, v_{WIND-VEL}) \quad (14)$$

$$y_{Aud\_IAQ\_CO2} = f(x_{Aud\_IAQ\_RH}, x_{Aud\_IAQ\_Temp}, v_{Aud\_Temp}, v_{Aud\_Lite}, v_{BAR-PRES}, v_{OA-HUMD}, v_{OA-TEMP}, v_{SOL-BEAM}, v_{SOL-HORZ}, v_{WIND-DIR}, v_{WIND-VEL}) \quad (15)$$

$$y_{Aud\_IAQ\_RH} = f(x_{Aud\_IAQ\_CO2}, x_{Aud\_IAQ\_Temp}, v_{Aud\_Temp}, v_{Aud\_Lite}, v_{BAR-PRES}, v_{OA-HUMD}, v_{OA-TEMP}, v_{SOL-BEAM}, v_{SOL-HORZ}, v_{WIND-DIR}, v_{WIND-VEL}) \quad (16)$$

In Eq. (14) to (16) y is the dependent IAQ parameter, x is the IAQ parameter used in this model as a predictor, v is the parameter indicating the outside weather conditions. The v and x parameters are listed in FIG. 14. The model $f(.)$ may be learned by a data mining algorithm. One advantage of the data-driven approach is that $f(.)$ can be easily and timely updated by the most current HVAC process data. Deriving an accurate virtual IAQ model that maps complicated relationships among the parameters of the HVAC system is a challenge.

The selection of an appropriate data mining algorithm is important for building an accurate, stable, and robust IAQ model. Different data mining algorithms may be applied for IAQ sensor modeling, and the performance of the various data mining algorithms may be analyzed. As above with respect to wind turbines, two basic metrics, the MAE (mean absolute error) and Std (standard deviation of absolute error) may be used to compare prediction accuracy. They may be computed to select the best data mining algorithm to extract the accurate IAQ sensor model (Eq. (14)-(16)). The small value of the MAE and Std implies the superior prediction performance of the IAQ model. The AE (absolute error), MAE (mean absolute error), and the Std (standard deviation) are expressed in Eq. (11) to (13) above.

The physical sensors installed in any HVAC system degrade over time, and this may lead to inferior performance, poor air quality, and energy waste due to incorrect feedback from the degraded IAQ sensors. A formal approach for on-line monitoring of IAQ sensors may be necessary. The IAQ sensor models built by data mining algorithms in accordance with embodiments of the present invention and control charts borrowed from statistical process control theory can be used to detect and remedy performance anomalies. Identifying sensor faults and on-line monitoring of the IAQ sensors is useful for optimizing the performance of HVAC systems.

FIG. 15 illustrates the basic concept of IAQ sensor modeling and on-line monitoring of embodiments described herein. As described above, a data mining algorithm may be used to identify IAQ sensor models based on the historical HVAC process data. The model can be updated to reflect the process change over time. The update frequency could be, for example, two weeks. The operational update frequency may depend on the HVAC system operational conditions and/or the accuracy requirements. Alternatively, a separate routine could monitor the model performance and refresh the model once its performance degraded. A control chart generated from the HVAC data can be used for on-line monitoring of an IAQ sensor. The IAQ models and control chart monitor the IAQ sensor performance at a certain time interval, e.g., every five minutes.

According to embodiments of the present invention, data mining algorithms may identify models for IAQ sensors that can serve as on-line indoor air quality profiles for temperature, $CO_2$, and relative humidity, respectively. The residual control chart approach (statistical quality control) [35, 36] may be used to analyze residuals between the model predicted IAQ value and the observed (measured by sensor) IAQ value. The residual is expressed in Eq. (17) [36]:

$$\epsilon = \hat{y} - y \quad (17)$$

where y is the observed IAQ value, and $\hat{y}$ is the reference value predicted by an IAQ sensor model.

The control chart approach [37, 35, 36] allows the residuals and their variations to be monitored, and thus detect abnormal conditions and an IAQ sensor fault. A training data set of $N_{Train}$ observations with outliers removed may be selected to build a control chart. The training data set may be represented as y_TrainSet=[y(i), ŷ(i)], i=1, . . . , $N_{train}$.

Using the training data set, the residual for each point may be computed, as well as the mean and the standard deviation of $\epsilon$. The mean residual $\mu_{Train}$ and the standard deviation $\sigma_{Train}$ are shown in Eq. (18) [38]:

$$\mu_{Train} = \frac{1}{N_{train}} \sum_{i=1}^{N} (\hat{y}(i) - y(i))$$

$$\sigma_{Train} = \sqrt{\frac{1}{N_{train} - 1} \sum_{i=1}^{N} ((\hat{y}(i) - y(i)) - \mu_{Train})^2} \quad (18)$$

The test data set y_TestSet=[y(i), ŷ(i)] includes $N_{test}$ consecutive data points drawn in time sequence from the test data set.

Similarly, the mean residual $\mu_{Test}$ and the standard deviation $\sigma_{Test}$ of the test data set are expressed as Eq. (19) [38]:

$$\mu_{Test} = \frac{1}{N_{test}} \sum_{i=1}^{N} (\hat{y}(i) - y(i)) \quad (19)$$

$$\sigma_{Test} = \sqrt{\frac{1}{N_{test}-1} \sum_{i=1}^{N} ((\hat{y}(i) - y(i)) - \mu_{Test})^2}$$

Once $\mu_{Train}$ and $\sigma_{Train}$ are known, the upper and lower control limits of the control chart may be computed and used to detect anomalies. Based on Eq. (18), the control limits of the control chart are derived from Eq. (20) [37, 35]:

$$UCL_1 = \mu_{Train} + \eta \frac{\sigma_{Train}}{\sqrt{N_{test}}} \quad (20)$$

$$CenterLine_1 = \mu_{Train}$$

$$LCL_1 = \mu_{Train} - \eta \frac{\sigma_{Train}}{\sqrt{N_{test}}}$$

$N_{test}$ is the number of points in y_TestSet, $\eta$ is the integer multiple for the control limits, and $N_{test}$ (e.g., fixed as 3) can be adjusted to make the control chart less sensitive to the data variability and thus reduce the risk of false alarms. According to one embodiment, $N_{test}$ may be set at 5 to make the control chart less sensitive to the data variability. If $\mu_{Test}$ is above $UCL_1$ or below $LCL_1$, the IAQ parameter value at the sampling time y_TestSet is considered to be deficient, and this type of fault detected by the control chart is defined as Fault Type I. Similarly, the control limits for $\sigma^2_{Test}$ can be calculated from Eq. (21) [37, 35]:

$$UCL_2 = \frac{\sigma^2_{Train}}{N_{test}-1} \times \chi^2_{\alpha/2, Ntest-1} \quad (21)$$

$$CenterLine_2 = \sigma^2_{Train}$$

$$LCL_2 = 0$$

where $\chi^2_{\alpha/2, Ntest-1}$ denotes the right $\alpha/2$ percentage points of the chi-square distribution, $N_{test}-1$ is the degree of freedom of the chi-square distribution. The parameter needs to be adjusted to make the control chart less sensitive to the variability of the data. $LCL_2$ is set to 0 to indicate that the variation of residuals in the test data is 0, so that the measured IAQ value matches the reference IAQ value in the normal status. If $\sigma^2_{Test}$ is above $UCL_2$, the IAQ parameter value at the sampling time y_TestSet is considered as deficient, and this type of fault detected by control chart is defined as Fault Type II.

Data-Driven Method of Creating Dynamic Models

Reference is now made to FIG. 16, which summarizes the method described above for creating dynamic models for use in optimizing the performance of various types of systems in accordance with embodiments of the present invention. As shown, the process may begin at Blocks 101 and 102 when historical values for one or more system parameters, which are grouped into controllable, non-controllable and performance parameters, are received. This may involve, for example, receiving data measured over a period of time (e.g., a day, week, month, etc.) by one or more sensors, such as one or more mechanical anemometers installed at the nacelle top of wind turbines in a wind farm, or one or more sensors associated with an HVAC system in a room/building.

As used herein, a controllable parameter refers to a parameter that a user associated with the system is able to control or manipulate. Examples of controllable parameters associated with a wind turbine may include the speed associated with the wind turbine generator and/or the pitch angle of the wind turbine's blade. Similarly, controllable parameters associated with a boiler-turbine system may include, for example, feeder speed, fan speed, preheat-coil temperature, and/or the like.

In contrast, therefore, non-controllable parameters refer to variables that are out of the user's hands but that nonetheless affect overall system performance. As discussed above, where, for example, the system is a boiler-turbine system, the non-controllable parameters may include, for example, outside air temperature and/or river water temperature. Similarly, a non-controllable parameter associated with a wind turbine may include wind speed, while the non-controllable parameters associated with an HVAC system may include, for example, inside room temperature, $CO_2$ and/or relative humidity.

Performance, or system state, parameters refer to parameters that can be used to evaluate or rate the overall performance of the underlying system and may include, for example, temperature, megawatt load, unit heat rate (UHR), fuel electricity rate (FER) and/or turbine heat rate associated with a boiler-turbine system. Performance parameters are often dependent upon controllable and/or non-controllable parameters and may be either calculated or measured.

Once the historical values have been received, a first set of predictors may, at Block 103, be determined based on the historical values of the non-controllable variables. In particular, according to embodiments of the present invention, the historical data is analyzed in order to determine which parameters may be used to predict the value of the non-controllable parameter of interest.

In many case, the analysis of the historical data may begin with the selection of candidate parameters based on the existing science and domain knowledge. However, models built with the parameters selected in this way may not be accurate. For example, predicting wind speed (virtual wind speed sensor) at a turbine 25 seconds from now based on the wind speed and wind direction measured at this time at another location will likely not be accurate.

Introducing a small number (e.g., two) additional parameters not seen in physics-based equations of a wind function, such as turbine generator torque and the standard deviation of the wind speed, could increase prediction accuracy of the model, though likely not to the degree needed. In contrast, in cases when the number of initially selected parameters is large, these parameters can be ranked in importance and the most significant parameters may be selected.

According to one embodiment, to derive accurate models, a memory may be introduced to the model. This may be accomplished by transforming the previously selected parameters. For example, the transformation may include subtracting two parameters values (e.g., pressure 1 minus pressure 2) in order to create a new parameter (i.e., pressure 3). Wind speed and generator torque measured every five second over a 60-second window may provide a set of inputs. As the number of input parameters increases, the best subset of predictors needs to be selected. To illustrate, the inputs (predictors) of the model for wind speed prediction 25 second from now may include, for example, the wind speed measured 25 seconds in the past, the generator torque measured 45 and 20 seconds in the past, and the predicted wind speed at 20 seconds from now. In general all the input values could come from one turbine or multiple wind turbines.

At Block 104, one or more optimal time instances at which each predictor is measured using non-uniform time scales may be determined and stored as a second set of predictors. In the example of the wind speed prediction (virtual wind sensor), the previously predicted values of the wind speed, the power predicted from another model, and/or other parameters, each measured at its own time scale, could be used to determine the wind speed at some future time.

One or more constraints may then be established for each of the controlled parameters. (Block 105). For example, as discussed above, the megawatt load of the boiler-turbine system may be constrained to ±1 MW. Examples of other constraints may include limiting the speed of the fuel feeder to 40 RPM/min, and/or limiting the primary air fun speed to 360 RPM/min, and/or the like.

A dynamic model of a sensor associated with one or more non-controllable variables may then be constructed based at least in part on the second set of predictors, the controllable variables and the performance parameters. (Block 106). In particular, as described above the dynamic model of the wind speed may include as input: (1) wind direction (non-controllable variable) measured 25 seconds in the past; (2) blade pitch angle (controllable variable) measured at 20 seconds in the past; (3) turbine power (performance variable) measured 45 seconds in the past; and (4) predicted wind speed (in general this is a performance variable) at 20 seconds from now. In the general, the predictors (inputs) could be the values of variables measured in the past or predicted by other models. Both the measured and predicated variables may originate at the system of interest (e.g., a wind turbine) or other systems (e.g., wind turbines at other locations). Such predictive models have been shown to accurately model combustion boilers, HVAC systems, wind turbines, and other processes. These model can be used to optimize performance and control processes (e.g., combustion, wind turbine power generation, energy to heat and chill buildings) as well as act as virtual sensors for measurable (e.g., wind speed) and non-measurable (e.g., combustion efficiency) variables.

Finally, the dynamic model may be optimized with a non-gradient-based algorithm, such as an evolutionary computation algorithm. (Block 107).

As described above, the dynamic model may be generated for various types of systems and may be used in various ways to improve performance of that system. For example, the optimization models may be used to generate values for controllable parameters associated with the system. In particular, as discussed above, the optimization models generated for the boiler-turbine system may provide values for feeder speed, fan speed, preheat coil temperature, and/or other controllable parameters.

As further described above, according to one embodiment, the models built with data-mining algorithms in association with an HVAC system may serve as virtual IAQ sensors in buildings and be used for on-line monitoring and calibration of the IAQ sensors. Similarly, the dynamic model may serve as a virtual wind speed sensor associated with a wind turbine, wherein the wind speed generated by the virtual sensor can be used, for example, for on-line monitoring and calibration of the wind speed sensors, as well as providing reliable wind speed input to a turbine controller.

Overall System and Mobile Device:

Referring now to FIG. 17, a block diagram of an entity capable of performing the method described above is shown in accordance with one embodiment of the present invention. The entity capable of performing the data-driven modeling described above may include various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of performing the data-driven method described above can generally include means, such as a processor 210 for performing or controlling the various functions of the entity.

In particular, the processor 210 may be configured to perform the processes discussed in more detail above with regard to FIG. 16. For example, according to one embodiment the processor 210 may be configured to receive the historical values of the system parameters; group the parameters into controllable, non-controllable and performance parameters; determine predictors from the non-controllable parameters based at least in part on the historical values of those parameters; determine optimal time instances for each predictor; and construct and optimize a dynamic model based at least in part on the optimal time instances, the controllable parameters and the performance parameters.

In one embodiment, the processor is in communication with or includes memory 220, such as volatile and/or non-volatile memory that stores content, data or the like. For example, the memory 220 may store content transmitted from, and/or received by, the entity. Also for example, the memory 220 may store software applications, instructions or the like for the processor to perform steps associated with operation of the entity in accordance with embodiments of the present invention. In particular, the memory 220 may store software applications, instructions or the like for the processor to perform the operations described above with regard to FIG. 16 for modeling non-controllable parameters of a system.

In addition to the memory 220, the processor 210 can also be connected to at least one interface or other means for displaying, transmitting and/or receiving data, content or the like. In this regard, the interface(s) can include at least one communication interface 230 or other means for transmitting and/or receiving data, content or the like, as well as at least one user interface that can include a display 240 and/or a user input interface 250. The user input interface, in turn, can comprise any of a number of devices allowing the entity to receive data from a user, such as a keypad, a touch display, a joystick or other input device.

Conclusion:

As described above, embodiments of the present invention provide a clustering approach to modeling a system (e.g., a boiler-turbine system, wind turbine, HVAC system, etc.). According to one embodiment, centroids were extracted from historical data and the centroid space was searched in order to improve system performance. The clustering-based approach can be easily implemented, is computationally efficient, and easily adapts to the process changes by online learning from the current process data. It is a good candidate for real-time performance optimization of boiler-turbine, and other, systems.

As described above and as will be appreciated by one skilled in the art, embodiments of the present invention may be configured as a system or method. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium.

Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 210 discussed above with reference to FIG. 17, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 210 of FIG. 17) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

REFERENCES

The following references are hereby incorporated herein by reference in their entirety:

[1] M. A. Abido, "Multiobjective evolutionary algorithms for electric power dispatch," *IEEE Trans. Evol. Comput.*, vol. 10, no. 3, pp. 315-329, June 2006.
[2] K. J. Astrom and R. D. Bell, "Drum-boiler Dynamics," *Automatica*, vol. 36, no. 3, pp. 363-378, 2000.
[3] R. D. Bell and K. J. Astrom, "Dynamic models for boiler-turbine-alternator units: Data logs and parameter estimation for a 160 MW unit," Lund Inst. Technol., Lund, Sweden, Tech. Rep. TFRT-3192, 1987.
[4] W. L. Brogan, *Modern Control Theory*, 3rd ed. Englewood Cliffs, N.J.: Prentice-Hall, 1991.
[5] A. Ben-Abdennour and K. Y. Lee, "An autonomous control system for boiler-turbine units," *IEEE Trans. Energy Conyers.*, vol. 11, no. 2, pp. 401-406, June 1996.
[6] B. W. Bequette, *Process Control: Modeling, Design and Simulation*. Upper Saddle River, N.J.: Pearson, 2003.
[7] A. Burns, A. Kusiak, and T. Letsche, "Mining transformed data sets," in *Knowledge-Based Intelligent Information and Engineering Systems*, Vol. I, R. Khosla, R. J. Howlett, and L. C. Jain, Eds. Heidelberg, Germany: Springer, 2004, pp. 148-154.
[8] F. P. de Mello, "Boiler models for system dynamic performance studies," *IEEE Trans. Power Syst.*, vol. 6, no. 1, pp. 66-74, February 1991.
[9] J. Espinosa, J. Vandewalle, and V. Wertz, *Fuzzy Logic, Identification and Predictive Control*. London, U.K.: Springer-Verlag, 2005.
[10] S. Farhad, M. Younessi-Sinaki, and M. Saffar-Avval, "Energy saving in operating steam power plants based on ASME performance test code," in *Proc. 2005 ASME Power Conf.*, Chicago, Ill., pp. 1381-1385.
[11] K. M. Hangos, R. Lakner, and M. Gerzson, *Intelligent Control Systems: An Introduction with Examples*. Amsterdam, The Netherlands: Kluwer, 2001.
[12] H. K. Khalil, *Nonlinear Systems*, 2nd ed. Englewood Cliffs, N.J.: Prentice-Hall, 1996.
[13] V. I. Kuprianov, "Applications of a cost-based method of excess air optimization for the improvement of thermal efficiency and environmental performance of steam boilers," *Renew. Sustainable Energy Rev.*, vol. 9, no. 5, pp. 474-498, 2005.
[14] A. Kusiak, A. Burns, and F. Mister, "Optimizing combustion efficiency of a circulating fluidized boiler: A data mining approach," *Int. J. Knowl.-Based Intell. Eng. Syst.*, vol. 9, no. 4, pp. 263-274, 2005.
[15] A. Kusiak and S. Shah, "A data-mining-based system for prediction of water chemistry faults," *IEEE Trans. Ind. Electron.*, vol. 53, no. 2, pp. 593-603, April 2006.
[16] A. Kusiak and Z. Song, "Combustion efficiency optimization and virtual testing: A data-mining approach," *IEEE Trans. Ind. Inf.*, vol. 2, no. 3, pp. 176-184, August 2006.
[17] S. Y. Li, H. B. Liu, W. J. Cai, Y. C. Soh, and L. H. Xie, "A new coordinated control strategy for boiler-turbine system of coal-fired power plant," *IEEE Trans. Control Syst. Technol.*, vol. 13, no. 6, pp. 943-954, November 2005.
[18] D. Li, T. Chen, H. J. Marquez, and R. K. Gooden, "Life extending control of boiler-turbine systems via model predictive methods," *Control Eng. Pract.*, vol. 14, no. 4, pp. 319-326, 2006.
[19] J. B. MacQueen, "Some methods for classification and analysis of multivariate observations," in *Proc. 5th Berkeley Symp. Math. Stat. Probab.*, Berkeley, Calif.: Univ. of California Press, vol. 1, 1967, pp. 281-297.

[20] U. C. Moon and K. Y. Lee, "A boiler-turbine system control using a fuzzy auto-regressive moving average (FARMA) model," *IEEE Trans. Energy Convers.*, vol. 18, no. 1, pp. 142-148, March 2003.

[21] M. Norggaard, O. Ravn, N. K. Poulsen, and L. K. Hansen, *Neural Networks for Modeling and Control of Dynamic Systems*. London, U.K.: Springer-Verlag, 2000.

[22] G. Pellegrinetti and J. Bentsman, "Nonlinear control oriented boiler modeling—A benchmark problem for controller design," *IEEE Trans. Control Syst. Technol.*, vol. 4, no. 1, pp. 57-64, January 1996.

[23] G. Poncia and S. Bittanti, "Multivariable model predictive control of a thermal power plant with built-in classical regulation," *Int. J. Control*, vol. 74, no. 11, pp. 1118-1130, 2001.

[24] J. A. Rossiter, *Model-Based Predictive Control: A Practical Approach*. New York: CRC, 2003.

[25] G. G. Rajan, *Optimizing Energy Efficiencies in Industry*. New York: McGraw-Hill, 2003.

[26] D. E. Seborg, T. F. Edgar, and D. A. Mellichamp, *Process Dynamics and Control*, 2nd ed. New York: Wiley, 2003.

[27] H. Taplin, *Combustion Efficiency Tables*. Lilburn, Ga.: Fairmont, 1991.

[28] W. Tan, H. J. Marquez, T. W. Chen, and J. H. Liu, "Analysis and control of a nonlinear boiler-turbine unit," *J. Process Control*, vol. 15, no. 8, pp. 883-891, 2005.

[29] P. N. Tan, M. Steinbach, and V. Kumar, *Introduction to Data Mining*. Reading, Mass.: Pearson Education/Addison Wesley, 2006.

[30] I. H. Witten and F. Eibe, *Data Mining: Practical Machine Learning Tools and Techniques*, 2nd ed. San Francisco, Calif.: Morgan Kaufmann, 2005.

[31] D. Yu and Z. Xu, "Nonlinear coordinated control of drum boiler power unit based on feedback linearization," *IEEE Trans. Energy Convers.*, vol. 20, no. 1, pp. 204-210, March 2005.

[32] J. H. Friedman, "Stochastic Gradient Boosting," *Computational Statistics & Data Analysis*, vol. 38, no. 4, pp. 367-378, 2002.

[33] J. H. Friedman, "Greedy Function Approximation: A Gradient Boosting Machine," *Annals of Statistics*, vol. 29, no. 5, pp. 1189-1232, 2001.

[34] R. Kohavi and G. H. John, "Wrappers for Feature Subset Selection," *Artificial Intelligence*, vol. 97, no. 1-2, pp. 273-324, 1997.

[35] D. C. Montgomery, *Introduction to Statistical Quality Control*, 5th ed., New York: John Wiley, 2005.

[36] L. Kang and S. L. Albin, "On-line monitoring when the process yields a linear profile," *Journal of Quality Technology*, vol. 32, no. 4, pp. 418-426, 2000.

[37] A. Mitra, *Fundamentals of Quality Control and Improvement*, 2nd ed., New Jersey: Prentice Hall, Upper Saddle River, 1998.

[38] G. Casella and R. Berger, *Statistical Inference*, 2nd ed., Pacific Grove, Calif.: Brooks/Cole, 1990.

That which is claimed:

1. A method for optimizing a system, comprising:
receiving one or more historical values for each of a plurality of system parameters;
grouping the system parameters into controllable parameters, non-controllable parameters, and performance parameters;
determining a first set of predictors from the non-controllable parameters using the historical values of these non-controllable parameters;
for each predictor in the first set of predictors, determining one or more optimal time instances at which a value of each predictor in the first set of predictors is measured using non-uniform time scales;
storing the optimal time instances for each predictor in the first set of predictors as a second set of predictors;
establishing one or more constraints for each of the controllable parameters;
constructing a dynamic model based on the second set of predictors, the controllable parameters, and the performance parameters; and
optimizing the dynamic model with a non-gradient-based algorithm.

2. The method of claim 1, wherein establishing one or more constraints for each of the controllable parameters comprises applying one or more of physical constraints, historical values observed, and industrial practice.

3. The method of claim 1 further comprising determining accuracy of the dynamic model.

4. The method of claim 3, wherein if the accuracy of the dynamic model is not satisfactory, the method further comprises generating a plurality of dynamic models based at least in part on grouped historical values for the system parameters.

5. The method of claim 4, wherein grouped historical values are generated from an optimized subset of the controllable, non-controllable, and performance parameters.

6. The method of claim 1, wherein the non-gradient-based algorithm is an evolutionary computation algorithm.

7. The method of claim 1, wherein determining a first set of predictors comprises selecting one or more of the system parameters capable of being used to predict respective non-controllable parameters.

8. The method of claim 1 further comprising:
using the dynamic model to generate a value for at least one of the controllable parameters.

9. The method of claim 1, wherein the system is selected from a group consisting of a boiler-turbine system, a wind turbine, and a Heating, Ventilation and Air Conditioning system.

10. The method of claim 9, wherein the system comprises a boiler-turbine system, the non-controllable parameters comprise outside air temperature and river water temperature, and the performance parameters comprise one or more of temperature, megawatt load, unit heat rate, fuel electricity rate and turbine heat rate.

11. The method of claim 9, wherein the system comprises a wind turbine and the system parameters are selected from a group consisting of generator torque, wind speed, power produced, generator speed, generator bearing, blade pitch angle, yaw error and rotor speed.

12. The method of claim 9, wherein the system comprises a Heating, Ventilation and Air Conditioning system and the system parameters are selected from a group consisting of temperature, $CO_2$, relative humidity, light level, barometric pressure, relative humidity, dry-bulb temperature, direct normal solar irradiation, total horizontal irradiation, wind direction and wind speed.

13. A computer program product for optimizing a system, said computer program product comprising at least one computer-readable storage medium having computer-readable program code portions stored therein, wherein the computer-readable program code portions comprise:
a first executable portion for receiving one or more historical values for each of a plurality of system parameters;
a second executable portion for grouping the system parameters into controllable parameters, non-controllable parameters, and performance parameters;

a third executable portion for determining a first set of predictors from the non-controllable parameters using the historical values of these non-controllable parameters;

a fourth executable portion for determining, for each predictor in the first set of predictors, one or more optimal time instances at which a value of each predictor in the first set of predictors is measured using non-uniform time scales;

a fifth executable portion for storing the optimal time instances for each predictor in the first set of predictors as a second set of predictors;

a sixth executable portion for establishing one or more constraints for each of the controllable parameters;

a seventh executable portion for constructing a dynamic model based on the second set of predictors, the controllable parameters, and the performance parameters; and an eighth executable portion for optimizing the dynamic model with a non-gradient-based algorithm.

14. The computer program product of claim 13, wherein the sixth executable portion further comprises applying one or more of physical constraints, historical values observed, and industrial practice.

15. The computer program product of claim 13 further comprising:

a ninth executable portion for determining accuracy of the dynamic model.

16. The computer program product of claim 15, wherein if the accuracy of the dynamic model is not satisfactory, the computer program product further comprises:

a tenth executable portion for generating a plurality of dynamic models based at least in part on grouped historical values for the system parameters.

17. The computer program product of claim 16, wherein grouped historical values are generated from an optimized subset of the controllable, non-controllable, and performance parameters.

18. The computer program product of claim 13, wherein the non-gradient-based algorithm is an evolutionary computation algorithm.

19. The computer program product of claim 13, wherein the third executable portion further comprises selecting one or more of the system parameters capable of being used to predict respective non-controllable parameters.

20. A system comprising:

a processor configured to:
receive one or more historical values for each of a plurality of system parameters;
group the system parameters into controllable parameters, non-controllable parameters, and performance parameters;
determine a first set of predictors from the non-controllable parameters using the historical values of these non-controllable parameters;
for each predictor in the first set of predictors, determine one or more optimal time instances at which a value of each predictor in the first set of predictors is measured using non-uniform time scales;
store the optimal time instances for each predictor in the first set of predictors as a second set of predictors;
establish one or more constraints for each of the controllable parameters;
construct a dynamic model based on the second set of predictors, the controllable parameters, and the performance parameters; and
optimize the dynamic model with a non-gradient-based algorithm.

* * * * *